Dec. 29, 1936.  P. A. JERGUSON  2,065,705
WATER LEVEL GAUGE
Filed Jan. 11, 1936
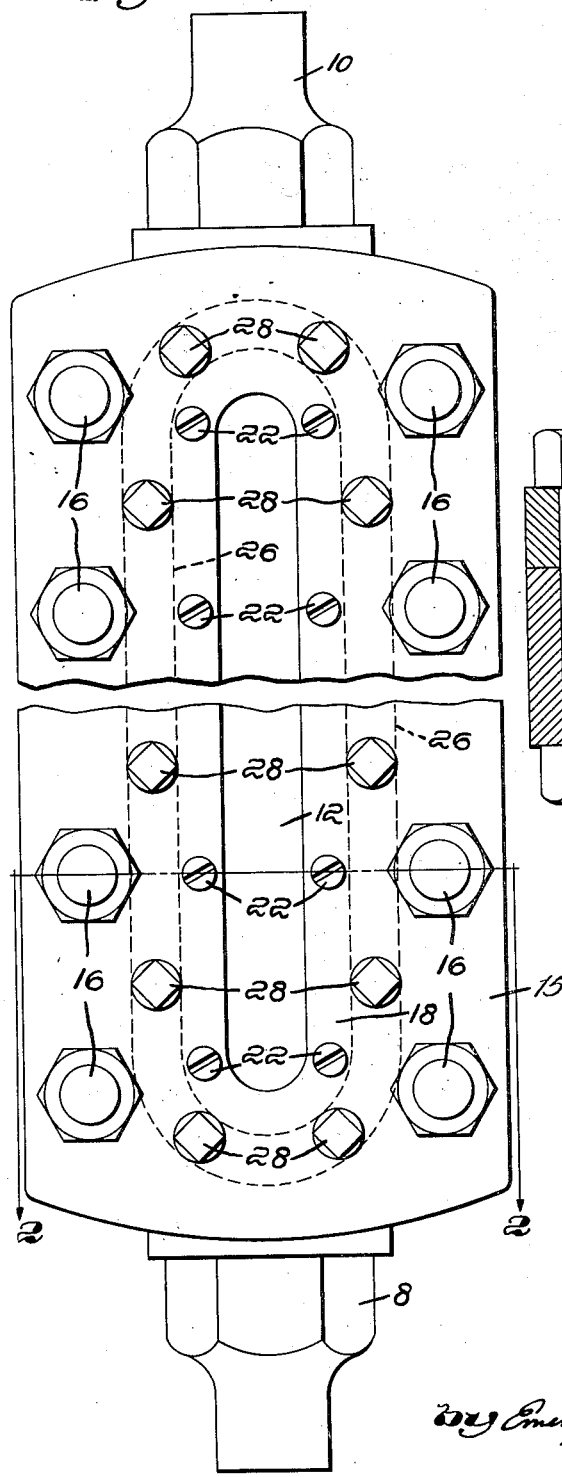
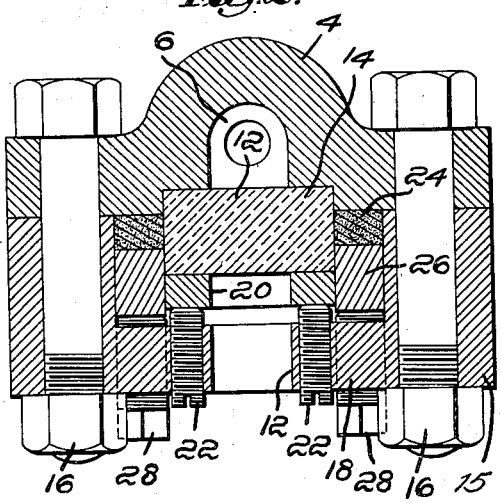
Inventor:
Philip A. Jerguson,
by Emery, Booth, Townsend, Miller & Weidner
Attys Patented Dec. 29, 1936

2,065,705

UNITED STATES PATENT OFFICE 2,065,705

WATER LEVEL GAUGE

Philip A. Jerguson, West Medford, Mass.

Application January 11, 1936, Serial No. 58,728

4 Claims. (Cl. 73—54)

This invention relates to water level gauges such as are used on steam boilers and more particularly to gauges of the type adapted for high pressure work wherein the water column is received in a chamber open at one or more sides to provide sight openings which are closed by glasses. A primary object is to provide a simple and efficient device of this nature wherein the harmful effects of the unequal expansion of the metal and glass, which in the gauges now commonly in use cause frequent breakages of the glasses, are substantially obviated.

My invention will be well understood by reference to the following description of an illustrative embodiment thereof shown by way of example in the accompanying drawing, wherein:—

Fig. 1 is a broken front elevation of the gauge illustrative of my invention; and Fig. 2 is a section on the line 2—2 of Fig. 1.

Referring to the drawing, the gauge there shown comprises a body 4 (Fig. 2) cut away between its ends to provide the open-sided chamber 6 adapted to be connected at 8 and 10 with the water and steam-containing spaces of the boiler. Herein the chamber is open on one side only, inspection of the water column being from that side, and the enclosure is completed by a square-edged glass 12 overlying the body 4 to cover the opening, the glass being herein shown as seated in a rabbet 14 around the margin of the opening.

Means are provided cooperating with the outer face of the glass 12 to secure the same in position, and I herein show means adjustable to accommodate the varied thicknesses of glasses which are encountered in commercial practice. Herein a member 15 is clamped to the margins of the body 4 by the bolts 16 and has an overhanging flange 18 defining a sight opening in alignment with the central portion of the glass. A frame 20 overlies the outer face of the glass adjacent its margin and is adjustably pressed thereagainst to hold the glass in position in the rabbet 14 by means of the screws 22 tapped through the flange 18.

To prevent leakage a packing gasket 24 encircles the glass and fits into the angle between the outer face of the body 4 and the square edge of the glass. A gland or follower ring 26 overlies the gasket and likewise encircles the glass. The gland may project outwardly beyond the outer face of the glass and provide a centralizing support for the frame 20, as best seen in Fig. 2, while the gasket and gland may be peripherally supported on the inner wall of the cavity which is formed beneath the flange 18. Screws 28 tapped through the flange 18 engage the gland 26, and when they are set up the gasket 24 is forced against the outer face of the body 4 and expanded laterally into contact with the side wall of the glass to form a tight joint.

In the construction described the metal parts of the gauge may expand freely with little or no strain on the glass. The pressure on the packing which forms the seal is independent of any clamping pressure on the face of the glass and the tension of the screws 22 which position the glass against the body need be relatively slight. Moreover, in the construction shown it is not necessary to provide a glass of accurate thickness, but on the contrary glasses of markedly different thicknesses such as are in practice procured from different makers can be used interchangeably.

I am aware that the invention may be embodied in other specific forms without departing from the spirit or essential attributes thereof, and I therefore desire the present embodiment to be considered in all respects as illustrative and not restrictive; reference being had to the appended claims rather than to the foregoing description to indicate the scope of the invention.

I claim:

1. A gauge comprising a body having an open-sided chamber to receive a water column and presenting a rabbet around the opening, a glass seated in the rabbet, a gasket and a gland encircling the glass, a frame overlying the margin of the glass and received within the gland, a member clamped to the body presenting a flange overlying the gland and frame, screws carried by the flange for acting on the gland, and other screws for adjustably positioning the frame.

2. A gauge comprising a body having an open-sided chamber to receive a water column, a glass overlying the opening, a gasket and gland encircling the glass, a member clamped against said body having a sight opening aligned with said open side, the marginal portion of said member about the opening overlying in spaced relation thereto the gland and the outer face of the glass, abutment means supported from said marginal portion and adjustably positionable at a variably determined distance therefrom for contacting the outer face of the glass to support it externally, and means independent of said abutment means acting on the gland to compress the gasket against said body and expand it laterally against the side of the glass.

3. A gauge comprising a body having an open-sided chamber to receive a water column, a glass overlying the opening, a gasket and gland encircling the glass, a member clamped against said body having a sight opening aligned with said open side, the marginal portion of said member about the opening overlying in spaced relation thereto the gland and the outer face of the glass, screws carried by the said marginal portion for acting on the gland to compress the gasket against said body and expand it laterally against the face of the glass, and independent adjustable means cooperating with the outer face of the glass to provide an external support therefor to position it over the opening.

4. A water gauge comprising a body member having an open side, a second member clamped thereto having a sight opening aligned with the open side, a glass over the opening in the body member, the assembled members defining side walls laterally spaced from the edge of the glass and an overhanging portion marginal of the sight opening, packing interposed between the side walls and glass, means passing through said overhanging portion and operating against the packing for compressing it in one direction and expanding it laterally against the casing walls and glass, and independent adjustable means cooperating with the outer face of the glass for maintaining it against the body member free of substantial clamping pressure thereagainst whereby the glass may slide freely thereover when expanding or contracting under temperature changes while tightly sealed about its edge.

PHILIP A. JERGUSON.